United States Patent [19]

Chen

[11] 4,344,982
[45] Aug. 17, 1982

[54] CARBONATE-ACRYLATE OR ALKYLACRYLATE RADIATION CURABLE COATING COMPOSITIONS AND METHOD OF CURING

[75] Inventor: Albert C. Chen, East Brunswick, N.J.

[73] Assignee: Mobil Oil Corporation, New York, N.Y.

[21] Appl. No.: 221,645

[22] Filed: Dec. 31, 1980

[51] Int. Cl.$^3$ .......................... B05D 3/06; C08F 2/46
[52] U.S. Cl. .................. 427/44; 204/159.23; 427/54.1
[58] Field of Search ................ 204/159.23; 526/309, 526/313, 314; 427/44

[56] References Cited

U.S. PATENT DOCUMENTS 2,575,585  11/1951  Cox et al. ............................ 526/314
3,619,260  11/1971  Parker ............................. 204/159.23
4,025,348   5/1977  Tsukada et al. ................. 204/159.15

FOREIGN PATENT DOCUMENTS 42-8292  4/1967  Japan.
47-17640 5/1972  Japan.

Primary Examiner—Theodore Morris
Attorney, Agent, or Firm—Charles A. Huggett; Michael G. Gilman; Edward J. Trojnar

[57] ABSTRACT

Radiation curable compositions particularly suitable for use by electron beam are disclosed, comprising a monomer of the formula:

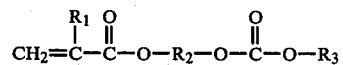

in which
- $R_1$ is H or alkyl of 1 to 4 carbon atoms;
- $R_2$ is alkylene or alkylene ether; and
- $R_3$ is alkylcycloalkyl, phenyl or substituted phenyl; and a polyfunctional acrylate of an alkylacrylate curing agent, e.g., the adduct of acrylic acid and a diglycidyl ether of Bisphenol A.

10 Claims, No Drawings

CARBONATE-ACRYLATE OR ALKYLACRYLATE RADIATION CURABLE COATING COMPOSITIONS AND METHOD OF CURING

BRIEF DESCRIPTION OF THE INVENTION

This application relates to coating compositions containing carbonate-acrylate or alkylacrylate monomer and polyfunctional acrylate or alkylacrylate, which are suitable for radiation curable coatings, particularly for curing by electron beam. The carbonate-acrylates are low viscosity liquids which are reactive diluents for polyfunctional acrylate and alkylacrylate resinous materials to give strong and useful coatings.

DETAILED DESCRIPTION OF THE INVENTION

The carbonate-acrylate and alkylacrylate monomers which comprise an essential ingredient of the compositions of this invention have the formula

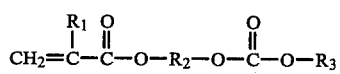

in which
$R_1$ is H or $C_1$–$C_4$ alkyl preferably H or $CH_3$,
$R_2$ is an alkylene radical of 2 to 6 carbon atoms which may contain O in the alkylene chain to form an alkylene ether radical; and
$R_3$ is $C_1$ to $C_{12}$ alkyl, cycloalkyl, phenyl or substituted phenyl.

Preferred cycloalkyl radicals are cyclopentyl and particularly cyclohexyl which can be substituted, for example by alkyl groups.

The phenyl radical can be substituted with non-interfering substituents such as $C_1$–$C_4$ alkyl; $C_1$–$C_4$ alkoxy halogen, articularly chloro, cyano, nitro and the like.

The other essential ingredient of the radiation curable compositions of this invention is a polyfunctional acrylate or alkylacrylate component.

Suitable materials of this type include the difunctional acrylates and alkylacrylates obtained by reacting a difunctional epoxide with acrylic acid, alkylacrylic acid or with a hydroxy alkyl ester of acrylic or alkylacrylic acid, for example 2-hydroxy ethyl acrylate. The preferred alkylacrylate is methacrylate.

Suitable epoxides for such adducts include diglycidyl ethers of Bisphenol A available as commercial materials such as Epon 828 and Epon 1004.

Other suitable polyfunctional acrylate or alkylacrylate materials include the esters of acrylic or methacrylic acid and aliphatic diols such as hexanediol diacrylate and trimethylol propane triacrylate.

The ratio of carbonate-acrylate or methacrylate monomer to polyfunctional acrylate or methacrylate crosslinking agent can vary widely but generally falls in the range of 80:20 to 20:80 on a weight basis.

Certain of the carbonate-acrylate or alkylacrylate compounds which serve as the monomer components of the compositions herein are themselves known. They can be prepared by methods analogous to that illustrated in Example 1 herein by reacting a hydroxyalkyl acrylate or alkylacrylate with chloroformate in the presence of a basic catalyst such as pyridine.

The compositions of this invention are applied to a suitable substrate, e.g., wood, metal, plastic, glass and paper, and cured by exposure to radiation such as electron beam or ultra-violet. Photoinitiators customarily used in ultra-violet polymerization can be advantageously included. Cured films of excellent characteristics are obtained.

The invention is illustrated by the following non-limiting examples in which all parts are defined by weight.

EXAMPLE 1

A solution was prepared by dissolving 62.4 parts of 2-hydroxypropyl acrylate, 37.9 parts of pyridine in 138.3 ml. of dry toluene. To the above was added 75.1 parts of phenyl chloroformate. The addition was complete in one hour and the reactants stirred and heated at 63° C. for one hour. The mixture was cooled and solid precipitate removed by filtration. To the filtrate was added 0.024 g of 4,4′ -methylenebis(2,6-di-t-butylphenol) and the solvents distilled out under vacuum. The product was then distilled under vacuum. The main portion came over at 140° C./0.2 mm Hg.

EXAMPLES 2–9

In a manner similar to that described in Example 1 compounds of the following formula were prepared:

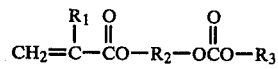

| EXAMPLE | $R_1$ | $R_2$ | $R_3$ |
|---|---|---|---|
| 2 | H | $CH_2CH_2$ | $CH_2CH_2CH_2CH_3$ |
| 3 | H | $CH_2CH(CH_3)$ | phenyl |
| 4 | H | $CH_2CH_2$ | phenyl |
| 5 | H | $CH_2CH(CH_3)$ | $CH(CH_3)CH_2CH_3$ |
| 6 | H | $CH_2CH_2$ | $CH(CH_3)CH_2CH_3$ |
| 7 | H | $CH_2CH(CH_3)$ | $CH(CH_3)CH_2-CH_3$ |
| 8 | H | $CH_2CH(CH_3)$ | $CH_2CH_3$ |
| 9 | H | $CH_2CH(CH_3)$ | $CH(CH_2CH_3)CH_2CH_2CH_2CH_3$ |

EXAMPLE 10

Each of the compounds of Examples 1–9 (60 weight percent) was mixed with 40 weight percent of a resinous difunctional adduct of Epon 828* and 2-hydroxyethyl acrylate.

\* Epon 828 is a diglycidyl ether of Bisphenol A having an epoxy equivalent weight of 185–192 available from Shell.

Each of the compositions were drawn down on a metal surface and electron beam irradiated at 5 megarad dosage. The weight yields of the cured films were in the 91.0 to 99.7% range. The films were then heated to 177° C. (350° F.). The baked yields were typically 90.0–96.5%

I claim:

1. A radiation curable composition comprising 20 to 80 weight percent of a monomer of the formula:

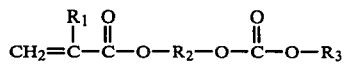

in which $R_1$ is H or alkyl of 1 to 4 carbons;

$R_2$ is an alkylene or alkylene ether radical of 2 to 6 carbon atoms;

$R_3$ is alkyl of 1 to 12 carbon atoms; cycloalkyl or substituted cycloalkyl of 5 to 12 carbon atoms; phenyl or substituted phenyl; and 20 to 80 weight percent of a polyfunctional acrylate or polyfunctional alkyl-substituted acrylate crosslinking agent.

2. The composition of claim 1 in which $R_1$ is H.

3. The composition of claim 1 in which $R_1$ is -CH$_3$.

4. The composition of claim 1 in which $R_2$ is an ethylene radical.

5. The composition of claim 1 in which $R_3$ is alkyl of 1 to 8 carbon atoms.

6. The composition of claim 1 in which the polyfunctional acrylate is the adduct of acrylic acid, methacrylic acid, acrylic acid hydroxyalkyl ester or methacrylic acid hydroxyalkyl ester and diglycidyl ether of Bisphenol-A.

7. The composition of claim 1 in which said polyfunctional acrylate is trimethylolpropane triacrylate.

8. The composition of claim 1 in which said polyfunctional acrylate is hexanedioldiacrylate.

9. The method of making a coating comprising applying a thin layer comprising the composition of claim 1 to a substrate and irradiating the layer with a dose of electron beam or ultraviolet radiation.

10. The method of claim 9 in which electron beam radiation is used.

* * * * *